United States Patent
Van Schijndel et al.

(10) Patent No.: US 7,169,454 B2
(45) Date of Patent: Jan. 30, 2007

(54) MULTI-STACK OPTICAL DATA STORAGE MEDIUM AND USE OF SUCH MEDIUM

(75) Inventors: Mark Van Schijndel, Eindhoven (NL); Guofu Zhou, Eindhoven (NL); Johannes Cornelis Norbertus Rijpers, Eindhoven (NL); Johannes Henricus Jocephus Roosen, Eindhoven (NL); Antonius Emilius Theodorus Kuiper, Eindhoven (NL)

(73) Assignee: Koninklijke Philips Electroinics N.V., Eindhoven (IL)

( * ) Notice: Subject to any disclaimer, the term of this patent is extended or adjusted under 35 U.S.C. 154(b) by 109 days.

(21) Appl. No.: 10/513,049

(22) PCT Filed: Apr. 11, 2003

(86) PCT No.: PCT/IB03/01509

§ 371 (c)(1),
(2), (4) Date: Oct. 29, 2004

(87) PCT Pub. No.: WO03/094160

PCT Pub. Date: Nov. 13, 2003

(65) Prior Publication Data

US 2005/0226128 A1    Oct. 13, 2005

(30) Foreign Application Priority Data

May 3, 2002    (EP) .................................. 02076765

(51) Int. Cl.
*B32B 3/02*    (2006.01)
(52) U.S. Cl. ................. 428/64.4; 369/13.39; 369/13.4; 369/13.53; 428/64.5
(58) Field of Classification Search ............... 428/64.5; 430/270.13
See application file for complete search history.

(56) References Cited

U.S. PATENT DOCUMENTS

| | | | |
|---|---|---|---|
| 5,876,822 A | 3/1999 | Zhou et al. | |
| 5,935,672 A | 8/1999 | Zhou et al. | |
| 6,007,889 A | 12/1999 | Nee | |
| 6,190,750 B1 | 2/2001 | Wierenga et al. | |

(Continued)

FOREIGN PATENT DOCUMENTS

WO    WO9750084    12/1997

(Continued)

*Primary Examiner*—Bruce H. Hess

(57) ABSTRACT

A description is given of a multi-stack optical data storage medium (20) for rewritable recording using a focused radiation beam (30) entering through an entrance face (16) of the medium (20) during recording. The medium (20) has a substrate (1). Deposited on a side thereof is a first recording stack (2) with a phase-change type recording layer (6). The first recording stack (2) is present at a position most remote from the entrance face (16). At least one further recording stack (3), with a phase-change type recording layer (12) is present closer to the entrance face (16) than the first recording stack (2). A metal reflective layer of Cu, transparent for the radiation beam (30), is present in the further recording stack (3) and has a thickness between 2 and 10 nm. A transparent spacer layer (9) is present between the recording stacks (2, 3). In such a way a metal reflective layer (14) with a high optical transmission combined with sufficient heat sink action is achieved which furthermore has a low chemical reactivity with adjacent layers.

6 Claims, 2 Drawing Sheets

U.S. PATENT DOCUMENTS

Figure 1:
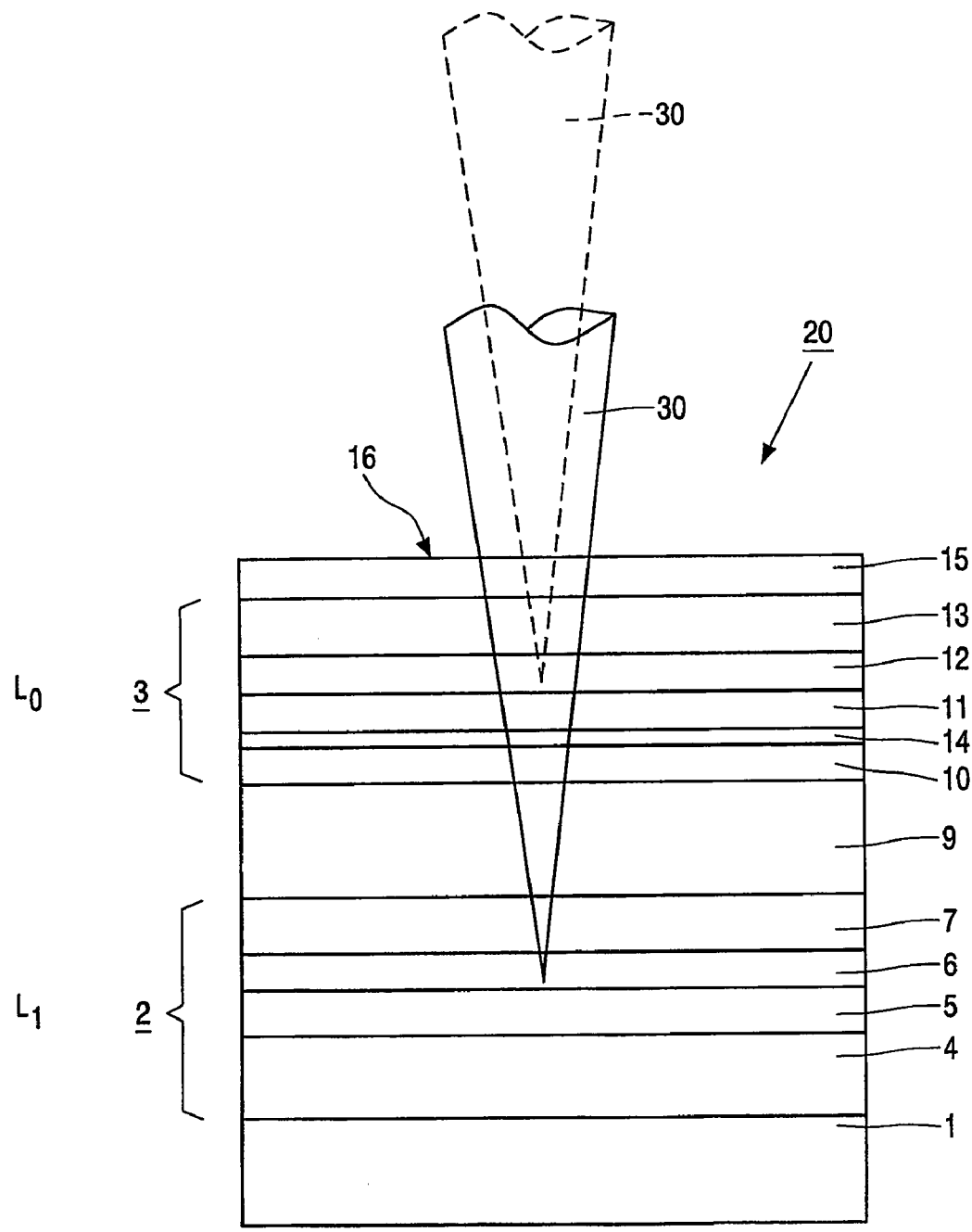

| | | |
|---|---|---|
| 6,355,326 B1 | 3/2002 | Lee et al. |
| 6,638,594 B1 | 10/2003 | Zhou |
| 6,751,184 B1 * | 6/2004 | Kojima et al. ............ 369/275.2 |
| 6,861,117 B1 * | 3/2005 | Rijpers et al. .............. 428/64.1 |
| 6,906,995 B1 * | 6/2005 | Togashi et al. ............. 369/283 |
| 2005/0003134 A1 * | 1/2005 | Rijpers et al. ............. 428/64.4 |
| 2006/0063108 A1 * | 3/2006 | Van Schijndel et al. ..................... 430/270.14 |

FOREIGN PATENT DOCUMENTS

| | | |
|---|---|---|
| WO | WO0113370 A1 | 2/2001 |

* cited by examiner

MULTI-STACK OPTICAL DATA STORAGE MEDIUM AND USE OF SUCH MEDIUM

The invention relates to a multi-stack optical data storage medium for rewritable recording using a focused radiation beam entering through an entrance face of the medium during recording, comprising:

a substrate with deposited on a side thereof:

a first recording stack comprising a phase-change type recording layer, said first recording stack being present at a position most remote from the entrance face, at least one farther recording stack, which comprises a phase-change type recording layer, being present closer to the entrance face than the first recording stack, and a metal reflective layer, transparent for the radiation beam, a transparent spacer layer between the recording stacks, said transparent spacer layer having a thickness larger than the depth of focus of the focused laser-light beam.

The invention also relates to the use of such a multi-stack optical data storage medium for high data rate recording applications.

An embodiment of an optical data storage medium of the type mentioned in the opening paragraph is known from U.S. Pat. No. 6,190,750, filed by Applicants.

An optical data storage medium based on the phase-change principle is attractive, because it combines the possibilities of direct overwrite (DOW) and high storage density with easy compatibility with read-only optical data storage systems. Data storage, in this context, includes digital video-, digital audio- and software-data storage. Phase-change optical recording involves the formation of submicrometer-sized amorphous recording marks in a crystalline recording layer using a focused relatively high power radiation beam, e.g. a focused laser-light beam. During recording of information, the medium is moved with respect to the focused laser-light beam that is modulated in accordance with the information to be recorded. Marks are formed when the high power laser-light beam melts the crystalline recording layer. When the laser-light beam is switched off and/or subsequently moved relatively to the recording layer, quenching of the molten marks takes place in the recording layer, leaving an amorphous information mark in the exposed areas of the recording layer that remains crystalline in the unexposed areas. Erasure of written amorphous marks is realized by recrystallization through heating with the same laser at a lower power level, without melting the recording layer. The amorphous marks represent the data bits, which can be read, e.g. via the substrate, by a relatively low-power focused laser-light beam. Reflection differences of the amorphous marks with respect to the crystalline recording layer bring about a modulated laser-light beam which is subsequently converted by a detector into a modulated photocurrent in accordance with the recorded information.

One of the most important requirements in phase-change optical recording is a high data rate, which means that data can be written and rewritten in the medium with a user data rate of at least 30–50 Mbits/s. A high data rate is particularly required in high-density recording and high data rate optical recording media, such as in disk-shaped CD-RW high speed, DVD-RW, DVD+RW, DVD-RAM, DVR-red and DVR-blue, also called Blu-ray Disk (BD), which respectively are abbreviations of the known Compact Disk and the new generation high density Digital Versatile or Video Disk+RW and -RAM, where RW and RAM refer to the rewritability of such disks, and Digital Video Recording optical storage disks, where red and blue refer to the used laser wavelength.

Such a high data rate requires the recording layer to have a high crystallization speed, i.e. a crystallization time of lower than 30 ns, during DOW. This also applies to the recording layers of multi-stack versions of mentioned disks. The complete erasure time (CET) is defined as the minimum duration of an erasing pulse for complete crystallization of a written amorphous mark in a crystalline environment. The CET is generally measured with a static tester. For DVD+RW, which has a 4.7 GB recording density per 120 mm disk, a user data-bit rate of 26 Mbits/s is needed, and for DVR-blue said rate is 35 Mbits/s. For high speed versions of DVD+RW and DVR-blue data rates of 50 Mbits/s and higher are required. The AV-information stream determines the data rate for Audio/Video (AV)-applications but for computer-data applications no restrictions in data rate apply, i.e. the higher the better. Each of these data bit rates can be translated to a maximum CET which is influenced by several parameters, e.g. thermal design of the recording stacks and the recording layer materials used.

To ensure that previously recorded amorphous marks can be recrystallized during DOW, the recording layer must have a proper crystallization speed to match the velocity of the medium relative to the laser-light beam. If the crystallization speed is not high enough the amorphous marks from the previous recording, representing old data, cannot be completely erased, meaning recrystallized, during DOW. On the other hand, when the crystallization time is short, amorphization becomes difficult because crystallite growth from the crystalline background is unavoidable. This results in relatively small amorphous marks (low modulation) with irregular edges, causing a high jitter level. This limits the density and data rate of the disk. A stack with a relatively high cooling rate is highly desired. In multi-stack optical recording it is difficult to fulfil this high cooling rate requirement for the "further" recording stack because of the absence of a layer with sufficient cooling capability in the further recording stacks. Multi-stack designs may be represented by a symbol $L_n$, in which n denotes 0 or a positive integer number. The stack through which the radiation beam enters is called $L_0$, while each deeper stack is represented by $L_1 \ldots L_n$. Deeper is to be understood in terms of the direction of the incoming radiation beam. Thus in case of dual stack design two stacks $L_0$ and $L_1$ are present. $L_0$ has to be substantially transparent to the radiation beam in order to make recording in the deepest "first" stack ($L_1$) possible. However, a layer that combines a relatively high transparency with still sufficient cooling, or heat sink action, is difficult to obtain.

It has been demonstrated with, for example, DVR disks that the jitter level and data rate can be significantly improved when an Al reflective layer is replaced by an Ag reflective layer in a so-called MIPI stack, where M is a metal reflective layer, I is ZnS—SiO2 and P is, e.g., a GeInSbTe recording layer. This is due to the fact that using Ag, because it has a better thermal conductivity than Al, enhances the cooling rate. This leads to realization of 50 Mbit/s DVR disks. However, the shelf life of the disk may become unacceptable due to the possible chemical reaction between Ag and the frequently used $ZnS—SiO_2$ dielectric layer, forming AgS. The introduction of thin Ag will lead to the above mentioned reaction and thus worsen the shelf life of the disk. This may cause a high noise level.

As said before, for multi-stack recording, the further recording stack(s), through which the radiation beam enters first, must be sufficiently transmissive to ensure proper read/write characteristics of the first recording stack. Said known medium of U.S. Pat. No. 6,190,750 has a $|IP_2IM_2I^+$

|S|IP$_1$IM$_1$ structure for rewritable phase-change recording which has two metal reflective layers M$_1$ and M$_2$, which respectively are relatively thick, with a high optical reflection, and relatively thin, with a relatively high optical transmission and substantial thermal conductivity. I represents a dielectric layer, I+ represents a further dielectric layer. P$_1$ and P$_2$ represent phase-change recording layers, and S represents a transparent spacer layer. In this structure the laser-light beam enters first through the stack (L$_0$) containing P$_2$. The metal layers not only serve as a reflective layer, but also as a heat sink to ensure rapid cooling for quenching the amorphous phase during writing. The P$_1$ layer is present proximate a relatively thick metal mirror layer M$_I$ which causes substantial cooling of the P$_1$ layer during recording while the P$_2$ layer is present proximate a relatively thin metal layer M$_2$ with limited heat sink properties. As already explained, the cooling behavior of a recording layer determines to a large extent the correct formation of amorphous marks during recording. Sufficient heat sink action is required in order to ensure proper amorphous mark formation during recording.

In the known medium, the metal layer M$_2$ preferably comprises Ag and has a thickness between 10 and 30 nm. It is stated that a thinner layer is insufficient for quenching, or rapidly cooling, the amorphous phase of the recording layer during recording. Because of the minimum thickness requirement the transmission of the M$_2$ layer is still relatively low. Therefore a substantially higher radiation beam write power for the L$_1$ recording layer is required. However, large radiation beam powers preferably are avoided because further recording stacks adjacent the first (L$_0$) recording stack may be undesirably heated by the radiation beam, which is focused onto the recording layer of the first recording stack.

It is therefore an object of the present invention to provide a multi-stack optical data storage medium of the kind described in the opening paragraph, in which the further recording stack comprises a transparent metal layer having a relatively high radiation beam transmission and sufficient heat sink action in order to ensure proper amorphous mark formation in the recording layer of said recording stacks and having a low chemical reactivity towards layers adjacent to the transparent metal layer.

This object is achieved in that the metal reflective layer mainly comprises the element Cu and has a thickness value selected from the range of 2 to 10 nm.

Figure 2A:
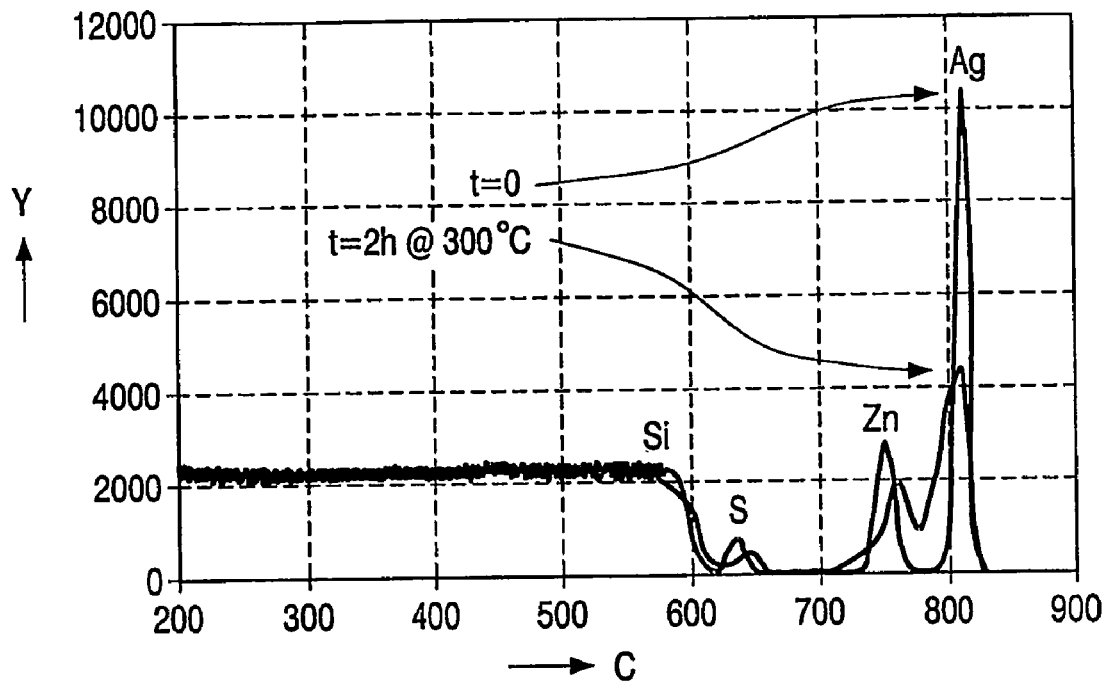
Figure 2B:
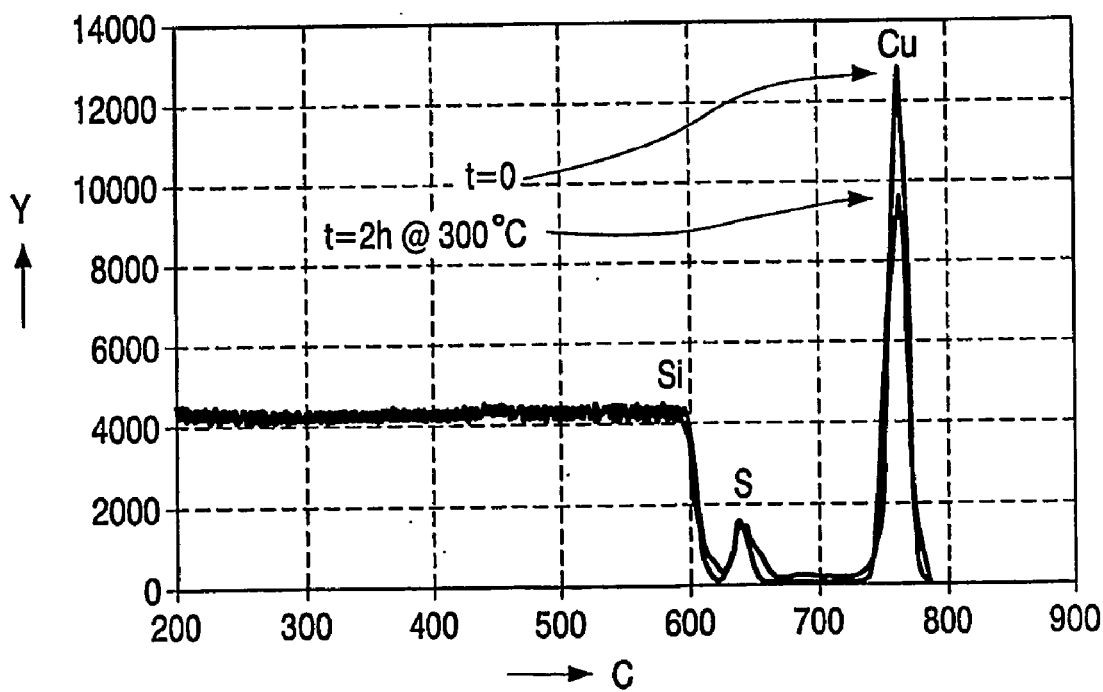

It is proposed to use a relatively thin Cu layer as a transparent metal reflective layer. Surprisingly, it was found that a Cu layer which has a low thickness, i.e. between 2 and 10 mn, still has considerable heat sink action in order to ensure proper amorphous mark formation and has a relatively high optical transmission for the radiation beam compared to other metals like Al, Ag. Furthermore a Cu layer has relatively low reactivity towards an adjacent layer, e.g. the ZnS—SiO$_2$ layer. Compared to Ag, which is very susceptible to the formation of AgS in combination with a ZnS—SiO$_2$ layer, hardly any reactivity can be measured as is shown in FIGS. 2A and 2B.

In an embodiment of the optical data storage medium according to the invention the metal reflective layer has a thickness value selected from the range of 6 to 8 nm. This range has proven to combine excellent recording behavior, e.g. low amorphous mark jitter values, with high optical transmission.

In another embodiment the metal reflective layer is present at a side of the recording layer of the further recording stack closest to the first recording stack. This has the advantage of a higher absorption of the recording layer of the L$_0$ stack.

In yet another embodiment a further metal reflective layer is present in the first recording stack at a side of the recording layer of the first recording stack most remote from the further recording stack. In such way the reflectivity of the first recording stack may be increased and furthermore the cooling behavior of the first recording stack, e.g. L$_1$, is properly balanced with the cooling behavior of the further recording stacks, e.g. L$_0$ in case of a dual stack medium. Because the first recording stack is the stack at which the radiation beam arrives last, the further metal reflective layer may be non-transparent. For the metal reflective layer of the first recording stack, metals such as Al, Ti, Au, Ni, Cu, Ag, Rh, Pt, Pd, Ni, Co, Mn and Cr, and alloys of these metals, can be used. Examples of suitable alloys are AlTi, AlCr and AlTa. The thickness of this metal reflective layer is not critical, but preferably the transmission is zero for obtaining maximal reflection. For practical reasons the thickness is usually not higher than about 100–150 nm.

In a favorable embodiment the further metal reflective layer mainly comprises the element Cu. Use of Cu in the first recording stack (L$_n$) has the advantage of a low chemical reactivity compared to Ag. Furthermore, in such a way the application of two different metals is avoided which is advantageous during production of the medium, e.g. more economic.

In advantageous embodiments the recording layers of the first or further recording stacks are in contact with at least one additional layer comprising a compound selected from the group consisting of Al$_2$O$_3$, SiC, Si$_3$N$_4$, MgO, ZnO and AlN including their non-stoichiometric compositions, said additional layer having a maximum thickness of 10 nm. These layers increase the crystallization speed of the amorphous marks during DOW, directly resulting in a higher possible data rate. The interface between these layers and the recording layer acts as a nucleation source for crystallization of the amorphous marks. The additional layer has a relatively small thickness. Therefore, the additional layer only has a relatively small influence on the transfer capability of heat in the recording layers to the heat sink layers. In other words, the heat sink action is hardly changed by the additional layer.

The recording layers preferably comprise the elements Sb and Te. The recording layers are of the phase-change type. A phase-change material shows a crystalline-amorphous phase transition. Further useful are compounds of In—Sb—Te, Te—Se—Sb, Ag—In—Sb—Te, Ge—Sb—Te, Ge—In—Sb—Te. Especially useful are the compounds described in the International Patent Applications No. WO 01/13370, corresponding to U.S. Pat. No. 6,638,594, and International Patent Application No. WO 97/50084, corresponding to U.S. Pat. Nos. 5,876,822 and 5,935,672, both filed by Applicants. The compounds in WO 97/50084 have a composition defined in atomic percentages by the formula: Ge$_{50x}$Sb$_{40-40x}$Te$_{60-10x}$, wherein $0.166 \leq x \leq 0.444$. These compositions are situated on the line connecting the compounds GeTe and Sb$_2$Te$_3$ in the triangular Ge—Sb—Te composition diagram, and include the stoichiometric compounds Ge$_2$Sb$_2$Te$_5$ (x=0.444), GeSb$_2$Te$_4$ (x=0.286) and GeSb$_4$Te$_7$ (x=0.166). These compounds show a short crystallization (erasure) time.

The compounds in WO 01/13370 have a composition defined in atomic percentages by the formula:

Q$_a$ In$_b$ Sb$_c$ Te$_d$ (in atomic percentages), wherein

Q is selected from the group consisting of Ag and Ge, $2 < a < 8$ $0 < b < 6$ $55 < c < 80$ $15 < d < 30$ and $a+b+c+d=100$.

Preferably, the recording layer of a further recording stack has a thickness between 3 and 15 nm. A thicker layer would result in a too low optical transmission. The recording layer of the first recording stack may be thicker, e.g. between 3 and 50 nm.

In all recording stacks, a dielectric layer is present at a side of the phase-change recording layer where the radiation beam enters and protects the recording layer from the influence of the generally organic spacer layer and optimizes the optical contrast. In view of this optical contrast, the thickness of this layer is preferably limited to the range of 15–150 nm.

In the first recording stack, the dielectric layer between the recording layer and the preferred metal reflective layer is between 10 and 40 nm, preferably between 15 and 30 nm. When this layer is too thin, the thermal insulation between the recording layer and the metal reflective layer is adversely affected. Therefore, the cooling rate of the recording layer may be too large, which leads to a poor crystallization process and possibly a poor cyclability. Increasing the thickness of the dielectric layer will decrease the cooling rate. A relatively thick dielectric layer is preferred in order to increase the sensitivity of the recording layer of the first recording stack.

The dielectric layers I are preferably made of a mixture of ZnS and $SiO_2$, e.g. $(ZnS)_{80}(SiO_2)_{20}$. The layers may also be made of $SiO_2$, $Ta_2O_5$, $TiO2$, $ZnS$, $Si_3N_4$, and $AlN$, including their non-stoichiometric compositions.

The transparent spacer layers between the first and further recording stacks have a thickness larger than the depth of focus of the laser-light beam, e.g. 10–50 µm. This thickness ensures that the first and second recording stacks are optically decoupled, i.e. a laser-light beam focused on the recording layer of the first recording stack does not read/write information from/onto further recording stacks, and vice versa. In this way, the storage capacity is increased with respect to a single-layered data storage medium. The material of the spacer layer is e.g. an UV-cured acrylate adhesive, in which servotracks may be provided by a replication process.

The substrate of the data storage medium may be transparent for the laser wavelength, and is made, for example, of polycarbonate (PC), polymethyl methacrylate (PMMA), amorphous polyolefin or glass. Transparency of the substrate is only required when the radiation beam enters the recording stacks via the entrance face of the substrate. In a typical example, the substrate is disk-shaped and has a diameter of 120 mm and a thickness of 0.6 or 1.2 mm. The substrate may be opaque when the laser-light beam enters the stack via the side opposite from the side of the substrate.

Each of the recording stacks of the disk-shaped substrate on the side of the recording stacks is, preferably, provided with a servotrack, which can be scanned optically. This servotrack is often constituted by a spiral-shaped groove and is formed in the substrate by means of a mould during injection molding or pressing. These grooves can alternatively be formed in a replication process in the synthetic resin of the spacer layer, for example, a UV light-curable acrylate.

Optionally, the outermost layer of the stack is screened from the environment by means of a protective layer of, for example a 0.1 mm UV light-cured poly(meth)acrylate (DVR) or a 0.6 mm polycarbonate disk (DVD). The protective layer must be of good optical quality, i.e. substantially free from optical aberrations and substantially uniform in thickness, when the laser-light enters the recording stacks via the protective layer. In this case, obviously, the protective layer is transparent to the laser-light.

Recording and erasing data in the recording layers of the recording stacks may be achieved by using a short-wavelength laser, e.g. with a wavelength of 670 nm (red) to 405 nm (blue) or even shorter.

Both the metal reflective layers, and the dielectric layers can be provided by vacuum deposition.

The phase-change recording layer can be applied to the substrate by vacuum deposition. Known vacuum deposition processes are evaporation (E-beam evaporation, resistant heated evaporation from a crucible), sputtering, low pressure Chemical Vapor Deposition (CVD), Ion Plating, Ion Beam Assisted Evaporation, Plasma enhanced CVD. Normal thermal CVD processes are not applicable because of too high reaction temperature.

The invention will be elucidated in greater detail by means of exemplary embodiments and with reference to the accompanying drawings, in which FIG. 1 shows a schematic layer structure of a double recording stack disk according to the invention;

FIGS. 2A and 2B respectively show a comparison of the interface stability of Ag and Cu with $ZnS: SiO_2$ obtained by Rutherford Backscattering Spectroscopy.

In FIG. 1, an embodiment of the multi-stack optical data storage medium 20 for rewritable recording by means of a laser-light beam 30 entering through an entrance face 16 of the medium 20 is shown. The medium has a substrate 1, made of polycarbonate (PC), with deposited on a side thereof:

a first recording stack 2 ($L_1$) comprising a phase-change type recording layer 6. The first recording stack 2 is present at a position most remote from the entrance face 16.

and a further recording stack 3 ($L_0$), which comprises a phase-change type recording layer 12. The further recording stack 3 is present closer to the entrance face 16 than the first recording stack 2.

and a metal reflective layer 14, transparent for the radiation beam 30.

The metal reflective layer 14 is made of Cu and has a thickness of 7 nm. A transparent spacer layer 9 is present between the recording stacks 2 and 3. The transparent spacer 9 layer has a thickness of 30 µm, which is larger than the depth of focus of the focused laser-light beam 30. The recording layer 6 of the first recording stack 2 comprises the compound with atomic composition $Ge_{5.0}In_{5.5}Sb_{65.0}Te_{24.5}$ and has a thickness of 15 nm. A further metal reflective layer 4, made of Cu and having a thickness of 100 nm, is present in the first recording stack 2 at a side of the recording layer 6 of the first recording stack 2 most remote from the further recording stack 3. A dielectric layer 5, having a thickness of 20 nm, is present between the recording layer 6 and the metal reflective layer 4. The dielectric layer 5 is made of the compound $(ZnS)_{80}(SiO2)_{20}$. A dielectric layer 7 made of $(ZnS)_{80}(SiO2)_{20}$, having a thickness of 90 nm, is present in the first recording stack 2 at a side closest to the further recording stack 3.

The recording layer 12 of the further recording stack 3 comprises the compound with atomic composition $Ge_{5.0}In_{5.5}Sb_{65.0}Te_{24.5}$ and has a thickness of 6 nm. Two dielectric layers 11 and 13, having a thickness of 6 nm and 60 nm respectively and made of the compound $(ZnS)80(SiO2)20$, are present adjacent the recording layer 12 of the second recording stack 3. A protective layer 15, made e.g. of a laser-light transparent UV curable resin having a thickness of 100 μm is present adjacent the further recording stack 3. Spincoating and subsequent UV curing may provide layer 15. The protective layer 15 may also be provided by applying, e.g., a sheet of polycarbonate (PC) by means of a Pressure Sensitive Adhesive (PSA) layer.

The following table summarizes a comparison of various parameters when Cu or Ag are used as reflective layers 14 and 4. Rc1 or Ra1 are defined as the optical reflection of the first recording stack 2 or $L_1$ stack, at a wavelength of 670 nm and when the recording layer 6 is in crystalline phase or amorphous phase respectively. The optical contrast is defined as |Rcn-Ran|/Rmaxn in which formula Rmaxn is the maximum value of either Rcn or Ran. The n denotes the stack ($L_n$). In this case Rmaxn=Rcn in either stack 3 ($L_0$) or stack 2 ($L_1$) because for this stack design Rcn is larger than Ran. Tc0 is defined as the transmission of stack 3 ($L_0$) when the recording layer 12 of stack 3 is in the crystalline phase.

Table 1, a comparison of various parameters for Cu and Ag

| Material | Thermal conductivity 27° C. (W/cm K) | Refractive index n (–) | Refractive index k (–) | Transmission (Tc0) for $L_0$ stack (670 nm) | Contrast for $L_0$ stack (670 nm) |
|---|---|---|---|---|---|
| Cu (7 nm) | 4.01 | 0.22 | 3.77 | 43.7% | 91% |
| Ag (7 nm) | 4.29 | 0.16 | 5.45 | 39.7% | 93% |

| Material | Reflection (Rc1) for $L_1$ stack (670 nm) | Contrast for $L_1$ stack (670 nm) |
|---|---|---|
| Cu (100 nm) | 22.6% | 98% |
| Ag (100 nm) | 23.6% | 98% |

The refractive index (n) and extinction coefficient (k) at 670 nm are listed in Table 1. The reflection, transmission and contrast of optimized stacks are also given in Table 1. It is shown that the $L_0$ stack with a reflective layer 14 of Cu has a transmission of approximately 44% and with Ag approximately 40% at a radiation beam wavelength of 670 nm and a thickness of 7 nm. When the recording layer 12 of $L_0$ is completely amorphous these values are 59% and 52% respectively. In practice a complete amorphous recording layer does not normally occur. It may be concluded that the transmission of the $L_0$ stack is about 10% higher when using Cu instead of Ag. The $L_1$ stack with a reflective layer 4 of Cu and the $L_1$ stack with a reflective layer 4 of Ag have a similar crystalline reflection and contrast.

The bulk thermal conductivity constants of Cu and Ag are also shown in Table 1. The bulk thermal conductivity of Cu is very close to that of Ag. It may be that the thermal conductivities of these metals in the form of thin layers have a different value and show a larger difference, because it was found that Cu shows a better recording, and thus cooling behavior, compared to Ag for comparable layer thicknesses. This can be concluded from recording experiments in which an $L_0$ recording stack 3 containing a Cu reflective layer 14 shows a broad optimum recording power window, i.e. including the use of higher recording powers, within which a low jitter level of 8.5% of written amorphous marks is obtained. This means that the use of higher recording powers still results into well-defined recording amorphous marks (low jitter levels), suggesting a high cooling rate of the stack 3. However, when Ag is used as reflective layer 14, this recording window becomes much narrower, indicating a lower cooling rate.

In FIGS. 2A and 2B Rutherford Backscattering Spectrometry (RBS) analysis results are shown for (Substrate)MI stacks with M=Ag and Cu respectively and I a $ZnS:SiO_2$ layer. (Sub)MI refers to an experimental stack made for use in a RBS-apparatus. High energy, e.g. 2 MeV, He+ ions are scattered by the atoms of the sample to be investigated. Measurement of the number of backscattered He+ ions, represented by normalized yield, as a function of energy or channel, provides information about the composition of the material as a function of depth. The depth scale is determined by the electronic stopping of the He+ ions in the sample. In the spectrum the horizontal axis represents the channel (C) and the vertical axis the normalized yield (Y). A $ZnS:SiO_2$ layer and subsequently an Ag or Cu layer were deposited by sputtering on a silicon substrate. After sputtering an RBS measurement is performed on the freshly deposited samples. In the obtained spectrum with different peaks the label "t=0" refers to the layers as deposited. Hereafter the samples are heated to a temperature of 300° C. during 2 hours in vacuum. This heating step accelerates reaction behavior between the metal and adjacent $ZnS:SiO_2$ layer. Subsequently the RBS measurement is repeated yielding a spectrum, which is labeled "t=2h@300° C.". A reaction of the metal layer with e.g. S from the $ZnS:SiO_2$ layer will be visible as a shifting and broadening of the S and metal peaks in the spectrum. In FIGS. 2A and 2B it is clearly visible that the peaks for all elements are separated from each other directly after sputtering. After treatment at 300° C. for 2 hours, interdiffusion occurs between the Ag and the ZnS—SiO2 layer, resulting in a large drop in each single peak and the transition from element to element becomes less sharp, as shown in FIG. 2A. This indicates that some compounds are formed as a result of chemical reaction. The reaction has almost completely disappeared when Ag is replaced by Cu, which is shown in FIG. 2B.

It should be noted that the above-mentioned embodiments and experimental data illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention, a multi-stack optical data storage medium for rewritable recording by means of a focused radiation beam is provided. The medium has at least two recording stacks comprising a phase-change type recording layer. The recording stacks other than the recording stack which meets the incoming radiation beam last have a metal reflective layer with a high transparency for the laser-light beam combined with a good cooling behavior of the recording layer in said stack. This is achieved in that the metal reflective layer mainly comprises the element Cu and has a thickness between 2 and 10 nm.

The invention claimed is:

1. A multi-stack optical data storage medium for rewritable recording using a focused radiation beam entering through an entrance face of the medium during recording, comprising:
   a substrate having deposited on a side thereof:
   a first recording stack comprising a phase-change type recording layer, said first recording stack being present at a position most remote from the entrance face,
   at least one further recording stack, which comprises a phase-change type recording layer, being present closer to the entrance face than the first recording stack, and a metal reflective layer, transparent for the radiation beam, and
   a transparent spacer layer between the recording stacks, said transparent spacer layer having a thickness larger than the depth of focus of the focused laser-light beam, characterized in that
the metal reflective layer mainly comprises the element Cu and has a thickness value selected from the range of 2 to 10 nm, and wherein the multi-stack optical data storage medium further comprises a further metal reflective layer in the first recording stack at a side of the recording layer of the first recording stack most remote from the further recording stack.

2. An optical data storage medium as claimed in claim 1, wherein the metal reflective layer has a thickness value selected from the range of 6 to 8 nm.

3. An optical data storage medium as claimed in claim 1, wherein the metal reflective layer is present at a side of the recording layer of the further recording stack closest to the first recording stack.

4. An optical data storage medium as claimed in claim 1, wherein the further metal reflective layer mainly comprises the element Cu.

5. An optical data storage medium as claimed in claim 1, wherein the recording layers of the first or further recording stacks are in contact with at least one additional layer comprising a compound selected from the group consisting of $Al_2O_3$, SiC, $Si_3N_4$, MgO, ZnO and AlN including their non-stoichiometric compositions, said additional layer having a maximum thickness of 10 nm.

6. An optical data storage medium as claimed in claim 1, wherein the recording layers comprise the elements Sb and Te.

* * * * *